United States Patent Office 3,259,347
Patented July 5, 1966

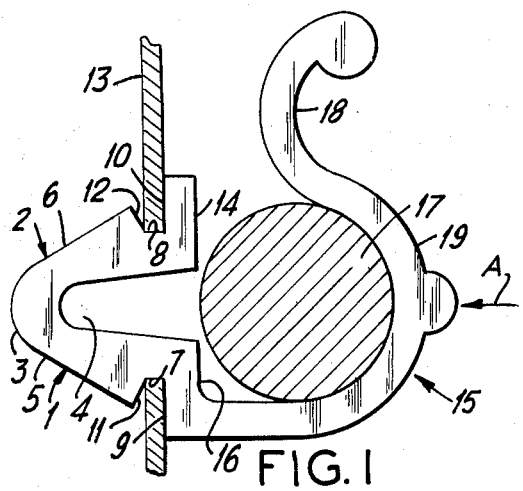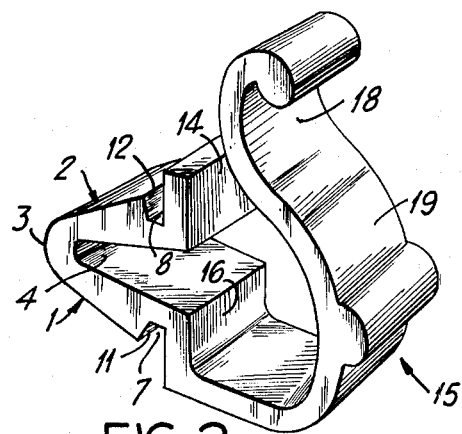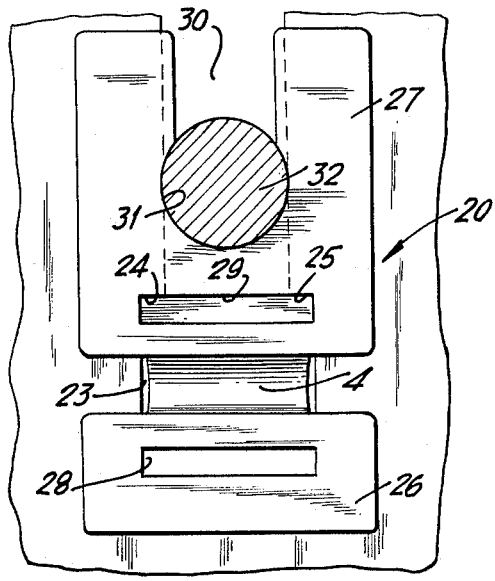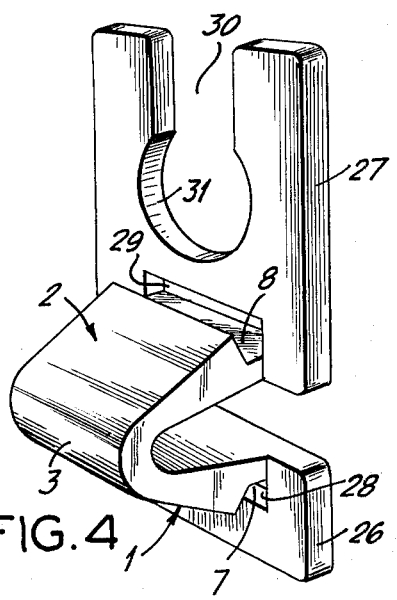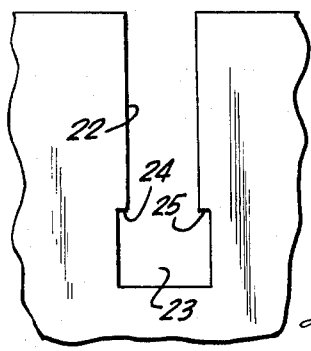

3,259,347
PLASTIC FASTENING DEVICE
Cyril J. Yates, Henderson, Ky., assignor to Cyanede Plastics, Inc., Henderson, Ky., a corporation of Kentucky
Filed July 16, 1965, Ser. No. 472,432
3 Claims. (Cl. 248—73)

The present invention relates to fastening devices and more particularly to a fastener adapted to be inserted into a hole or slot and used to hold a wire or other device.

It is the objective of the present invention to provide a relatively inexpensive fastener which is secured by simply pushing it into a suitable hole or slot.

In accordance with the present invention, a one-piece fastener (anchor) is molded from resilient plastic. The fastener is formed so that the end inserted into the panel has two legs joined in a U-shape. This shape provides a self-springing action so that the legs are pushed together when the fastener is inserted and then, by themselves, spread apart to retain the fastener in position. A specially adapted pair of channels and flanges maintain the fastener in the desired alignment after its insertion. The outer end of the fastener has means, for example a curved arm, to retain the wire or other device.

Other objectives will be apparent from the description below of two embodiments of the invention, taken in conjunction with the accompanying drawings, in which:

FIGURE 1 is a side view of the first embodiment of the present invention inserted into a panel;

FIGURE 2 is a perspective view of the fastener shown in FIGURE 1;

FIGURE 3 is a front plan view of the fastener of the second embodiment;

FIGURE 4 is a perspective view of the fastener shown in FIGURE 3; and

FIGURE 5 is a front plan view of a portion of the panel adapted to receive the fastener of FIGURES 3 and 4.

The fastener shown in FIGURES 1–4 are molded in one piece out of a relatively tough resilient spring-like plastic. The fasteners may be molded in white or in color and in various sizes.

The fasteners are adapted to be inserted in rectangular shaped holes or channels in thin panels, for example sheet metal.

The fastener of FIGS. 1 and 2 comprises two wing members 1 and 2 joined together by an arcuate portion 3. The opening 4 between the wing members 1 and 2 is elongated. The wing members 1 and 2 are thicker as they extend backwards from the arcuate portion 3. The exterior faces 5 and 6 of wing members 1 and 2, respectively, from a V shaped wedge. The wing members have intended channels 7 and 8. The bottom width of these channels is determined by the width of the panel 13 in which the fastener is inserted. For example, if the panel 13 is 0.04 inch thick, then the bottom thickness of the channel will also be 0.04 inch. The outer walls 9 and 10 of channels 7 and 8, respectively, are straight, that is, at right angles to the axis through opening 4. The opposite inner walls 11 and 12 are at an angle, preferably 30°, to their outer walls 9 and 10. The back edges 16 and 14 are also vertical to the axis through the opening 4.

A curved arm 15 is integral with the back 16 of wing member 1. The arm preferably is as wide as the wing members. Since arm 15 is made from the same plastic as the wing member, it also is resilient. The arm 15 is molded so that its top rearward curved handle portion 18 is inside of the arm to permit the insertion of a wire 17 or other device such as a strip. The arm 15, when the opening pressure is removed, closes on the wire 17 and holds it securely.

The arm preferably is shaped to form a semi-circular portion 19 and its top handle portion 18 is curved back from the curvature of the semi-circular portion.

In the fastener 20 shown in FIGS. 3 and 4, the wing members 1 and 2, the arcuate portion 3, the opening 4, and the channels 7 and 8 are the same as in the embodiment shown in FIGS. 1 and 2. The fastener 20 is inserted into a panel, shown in FIG. 5, which has a straight-walled slot 22. Slot 22 terminates in a rectangular opening 23 whose width is slightly greater than the width of the slot 22 so that shoulders 24 and 25 are formed.

The fastener 20 has two flange members 26 and 27 which are integral with their wing members 1 and 2, respectively. Flange 26 is similar to the flange formed by walls 10 and 14 of the embodiment of FIGS. 1 and 2, except it preferably is longer and has a rectangular slot 28 through it. Flange 27 has a similar slot 29, these slots saving plastic material without weakening the fastener.

An elongated channel 30 is formed in flange 27, the channel 30 having a circular bottom portion 31. A wire 32, or other round device to be held, is inserted down through the channel 30 and into circular portion 31 which holds it in position.

To insert the fasteners of FIGS. 1–4 into their holes. one simply pushes on their backs, i.e. in the direction of arrow A, of FIG. 1. The wedging action of the top and bottom of the hole forces the wing members together and narrows the space 4. When the fastener is in place in the panel, that is, when the panel is within channels 7 and 8, the wings expand by themselves to retain the fastener in its place.

My invention is not limited to the embodiments of FIGS. 1–4 since other variations may be made. For example, the shape of arm 15 may be altered to accommodate other devices such as a square strip.

Having described preferred embodiments of my invention, I claim:

1. a fastener adapted to be inserted into a panel being a one-piece member composed of resilient plastic and including as integral portions:

first and second wing members joined by an arcuate member;

the first and second wing members having exterior faces which slant to form a V shaped wedge and having an open space between their interior faces;

a depressed portion on the exteriors of the first and second wings and flange members attached at the end of each of the said wings opposite to the arcuate portion, the said depressed portions and flanges forming channels whose bottom width is adapted to be substantially the same as the thickness of the panel; and an arm extending from one of the flanges and adapted to hold an object.

2. A fastener as claimed in claim 1, wherein the arm is adapted to hold a round object and consists of a substantially semi-circular portion and a curved handle extending from the semi-circular portion and having an opposite curvature to that portion.

3. A fastener as claimed in claim 1, wherein the arm is a flat member which is an extension of its flange and has an elongated opening terminating in a circular opening.

References Cited by the Examiner

UNITED STATES PATENTS

| | | | |
|---|---|---|---|
| 2,200,047 | 5/1940 | Tinnerman | 24—73 |
| 3,015,869 | 1/1962 | Rapata | 24—213 |
| 3,074,675 | 1/1963 | Brown | 248—68 |
| 3,090,826 | 5/1963 | Cochran | 174—158 |
| 3,113,754 | 12/1963 | Jansson | 248—74 |

CLAUDE A. LE ROY, *Primary Examiner.*